United States Patent [19]

Pfeiffer

[11] 4,417,138
[45] Nov. 22, 1983

[54] CREDIT CARD, PROCESS AND MARKING APPLIANCE FOR MANUFACTURING SAID CREDIT CARD, AND MARKING APPLIANCE FOR MARKING SAID CREDIT CARD IN ORDER TO EFFECT DEDUCTIONS FROM A CREDIT REPRESENTED BY THE CARD

[75] Inventor: Horst Pfeiffer, Aldingen, Fed. Rep. of Germany

[73] Assignee: J. Hengstler K.G., Aldingen, Fed. Rep. of Germany

[21] Appl. No.: 362,062

[22] Filed: Mar. 26, 1982

[30] Foreign Application Priority Data

Mar. 31, 1981 [DE] Fed. Rep. of Germany ....... 3112664

[51] Int. Cl.³ ............................................. G06K 19/06
[52] U.S. Cl. .................................... 235/492; 235/487; 235/488
[58] Field of Search ........................ 235/488, 492, 487

[56] References Cited

U.S. PATENT DOCUMENTS

4,104,515   8/1978   Thornburg ..................... 235/492 X

Primary Examiner—Harold I. Pitts
Attorney, Agent, or Firm—Balogh, Osann, Dvorak, Kramer, Genova, & Traub

[57] ABSTRACT

This invention relates to metal-coated credit cards and to appliances for marking said credit cards in order to make deductions from the credit represented by the card. It is an object of the invention to provide such a card and marking appliance which can be used for an automatic accounting of services used for merchandise taken, such as copies taken from automatic copiers. For this purpose the metal-coated credit card which is adapted to be marked by a marking appliance in order to make deductions from the credit represented by the card has electrically conductive areas separated by electrically non-conducting areas. The credit card comprises a code-representing area, particularly at one edge of the card, and a credit-representing area which is spaced from the edges of the card and can be electrically marked in incremental areas in order to make deductions from the credit represented by the card.

36 Claims, 12 Drawing Figures

CREDIT CARD, PROCESS AND MARKING APPLIANCE FOR MANUFACTURING SAID CREDIT CARD, AND MARKING APPLIANCE FOR MARKING SAID CREDIT CARD IN ORDER TO EFFECT DEDUCTIONS FROM A CREDIT REPRESENTED BY THE CARD

BACKGROUND OF THE INVENTION

This invention relates to a credit card, to a process and an electrically operated appliance for manufacturing said credit card, and to an electrically operated appliance for marking said credit card in order to make deductions from a credit represented by said card.

Known value and/or credit cards comprise magnetic strips and can be inserted into writing and reading appliances in order to read the remaining credit, to make deductions and to write the credit which remains after the deduction. Such credit cards often contain visible markings, which indicate the remaining credit to the user. These systems have the disadvantage that all functions, such as detection of remaining credit, recognition of code, deduction and visible marking, can be performed only by different processes, which are technically difficult and expensive.

It is an object of the invention to provide an appliance for deducting value units on a credit card. By means of such an appliance the charges involved in the use of servies or the delivery of merchandise, such as copies from an automatic copier, should be automatically deducted. An automatic deduction should be permitted with a data carrier and a reading and writing appliance which involve only a minimum expenditure so that the system can be used also for transactions which involve only a relatively small value so that the use of expensive appliances or processes would not be justified.

SUMMARY OF THE INVENTION

A credit card on which deductions can be made comprises a surface that can be electrically marked and has electrically conducting areas separated by electrically non-conducting boundaries. The card has an electrically conductive coating including a preferably marginal code-representing area for receiving code markings, a credit-representing area for receiving accounting markings a terminal area surrounding said credit-representing area, and electrically non-conducting barriers separating said code-representing area from said terminal area. The credit-representing area is adapted to be electrically marked to effect successive visible deductions from a credit represented by the card. With this credit card, The requirements stated hereinbefore can be met with a minimum expenditure by the use of an electric marking process. The credit card constitutes an inexpensive data carrier and can be manufactured by a suitable marking appliance and can be marked to effect the deductions by another marking appliance.

An electrically operated appliance is provided for defining on the credit card a marginal code-representing area a credit-representing area. Another electrically operated marking appliance is provided, which comprises contact means for detecting the code in the code-representing area and means which in response to the detection of the code can be operated to mark the card in the credit-representing area so as to effect a deduction from the credit and to effect a clearance.

BRIEF DESCRIPTION OF THE DRAWINGS

Further details of the system embodying the invention will be described hereinafter with reference to the drawing, which shows preferred embodiments and in which FIGS. 6a and 6b shows a detail of the electrode array.

DESCRIPTION OF THE PREFERRED EMBODIMENT

Figure 1:
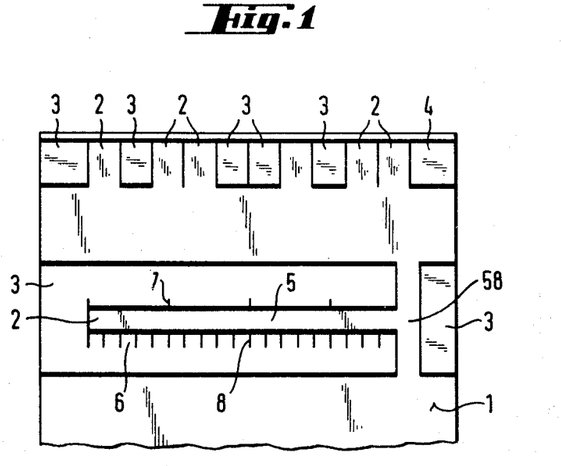
FIG. 1 shows a credit card embodying the invention.

A credit card embodying the invention is diagrammatically shown in FIG. 1. The credit card has a surface provided with a coating of electrically conductive metal. That coating includes a terminal area 1, an elongated credit-representing area 5, which is electrically conductively connected at one end to the terminal area 1 by a conductive strip 58, and a code-representing area 4, which has portions 2 which are electrically conductively connected to the terminal area 1 by the conductive strip 58, and isolated portions 3, which are electrically disconnected from the terminal area 1 so that the code-representing area consists of a pattern of the electrically connected areas 2 and the isolated areas 3. Except at the end connected to the conductve strips 58, the code-representing area is surrounded by a U-shaped isolated area 3, which is electrically disconnected from the terminal area. Another isolated area 3 which is electrically disconnected from the terminal area 3 is provided on that side of the conductive strip 58 which is opposite to the credit-representing area 5. The isolated areas 3 are defined by longitudinally and transversely extending non-conducting portions, in which the metal coating has been removed from the card. That pattern can be read to identify the credit card. The area 5 represents an initial credit and can be marked, beginning at 6, by a marking appliance, which will be described more fully hereinafter, for making successive deductions from said credit. The remaining credit can be read by means of scale imprints 7 and 8.

Figure 2:
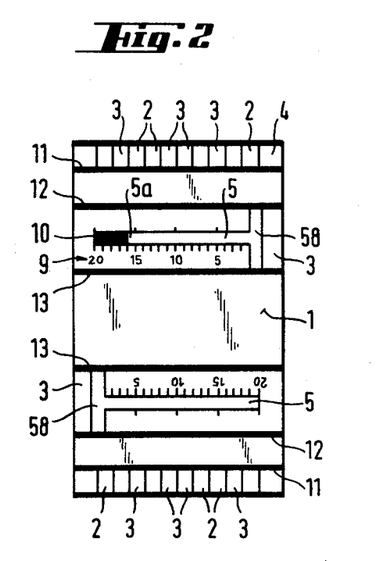
FIG. 2 is a double-ended credit card.

As ist apparent from FIG. 2 the scales 7 and 8 provided with printed numerals 9 permit the user of the credit card to read from the area 5 how much of the initial credit has been deducted. For this purpose a portion of the metal coating on the area 5 is burnt off in each deducting step. The total area which has been burnt off is designated 10.

When the numerals 9 and other inscriptions are printed on the credit card, bars 11, 12 and 13 are also printed on the card. These bars cover the transversely extending non-conducting portions which define the isolated portions 3.

In the embodiment shown in FIG. 2, the credit card has only a credit capacity of, e.g., 20 value units. FIG. 2 shows a double credit card having a double credit capacity. If this card is provided with a metal coating also on the rear, it will have four times the credit capacity of the card of FIG. 1.

Figure 3:
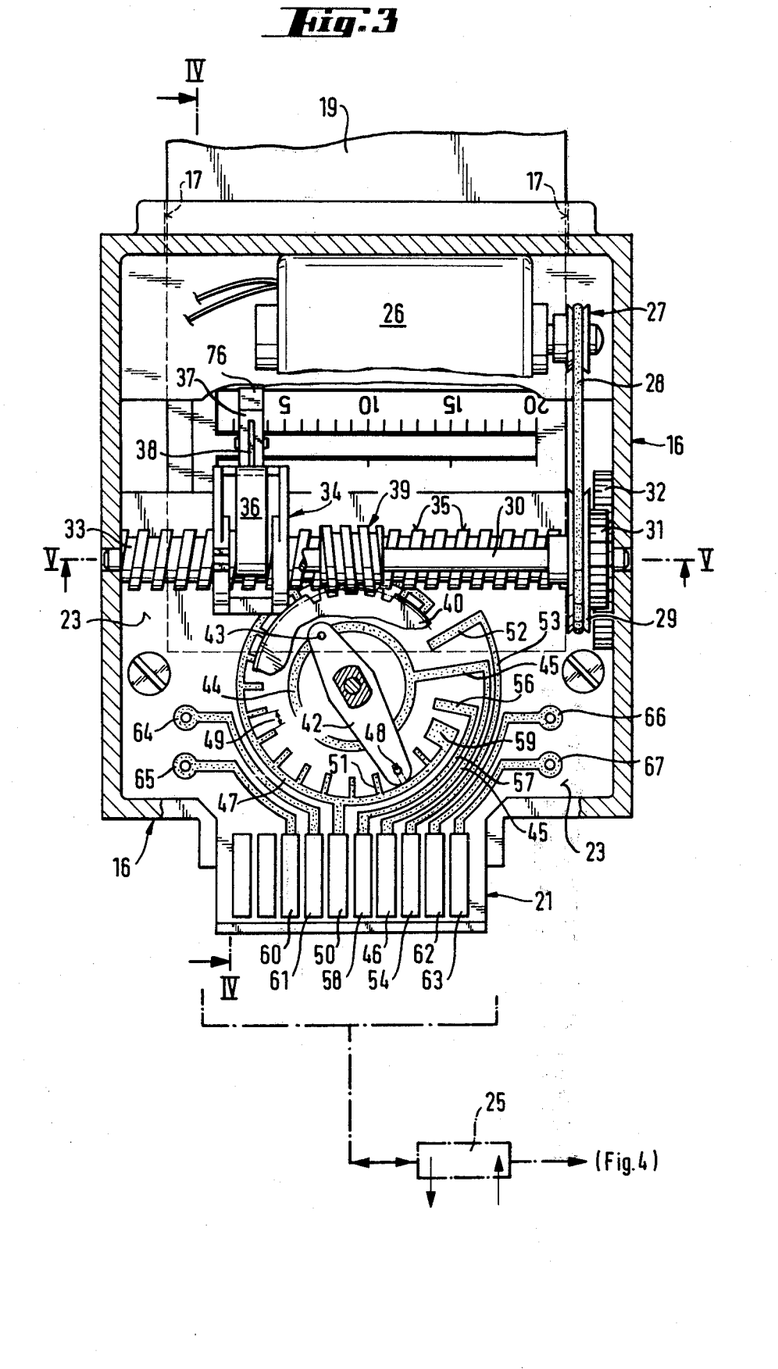
FIG. 3 is a top plan view, partly cut away, showing an associated marking appliance for making deductions.
Figure 4:
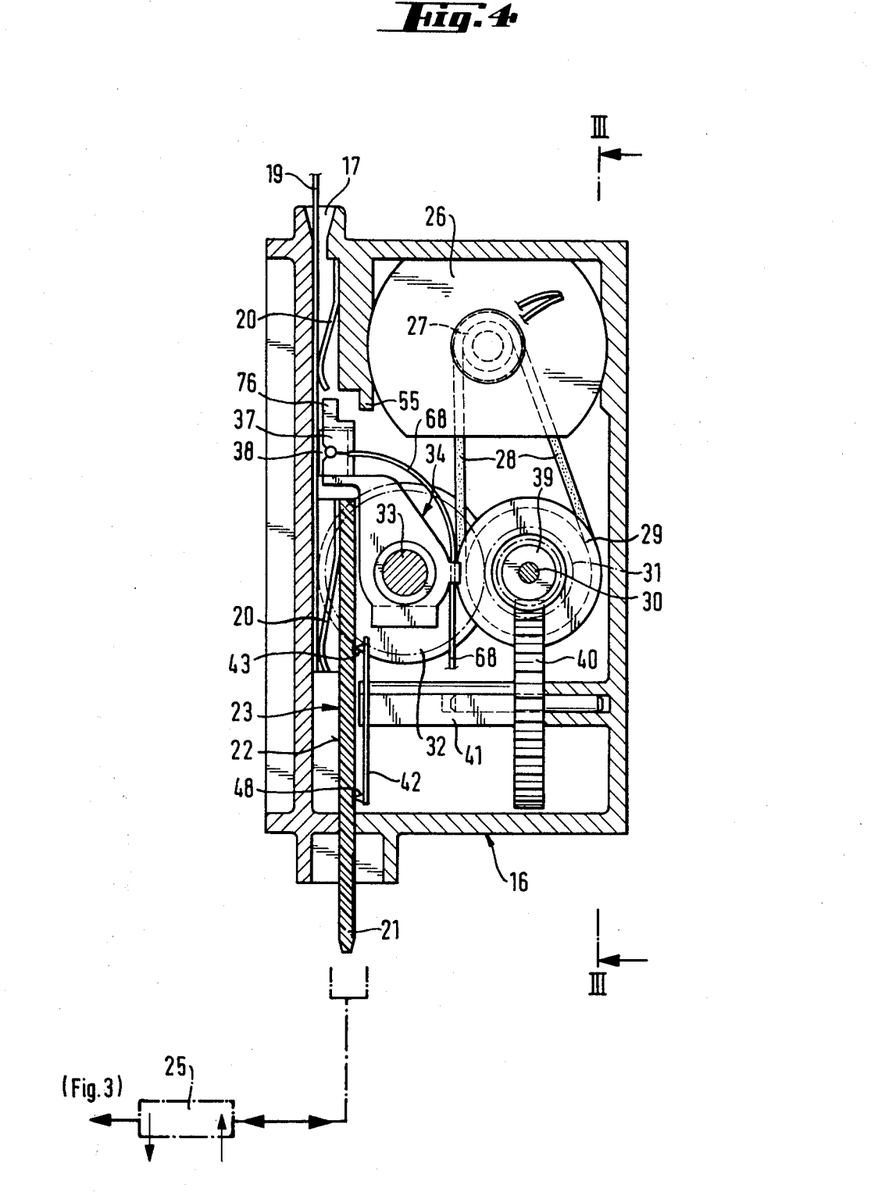
FIG. 4 is a longitudinal sectional view showing the appliance of FIG. 3.
Figure 5:
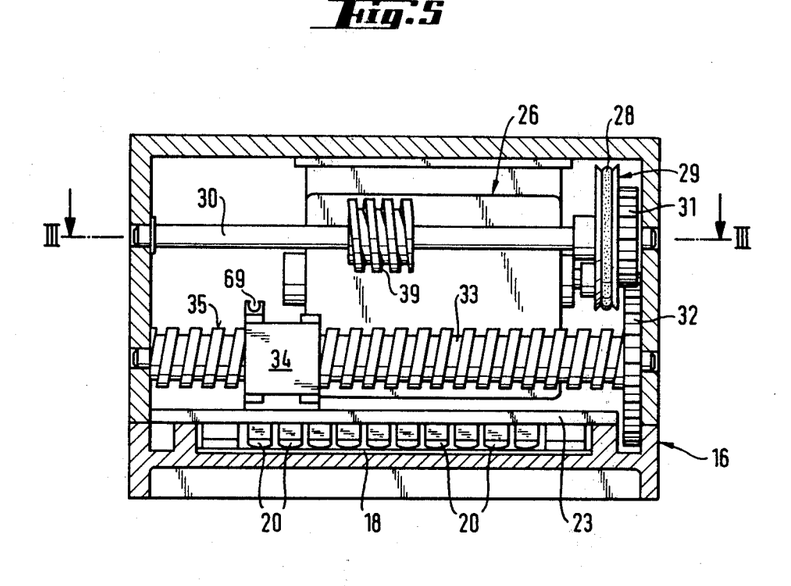
FIG. 5 is a transverse sectional view showing the appliance of FIG. 3, FIG. 6 including

An appliance for making the card in the credit-representing area 5 in order to effect deductions is shown in FIGS. 3 to 5. The appliances comprises a frame 16, which defines a card-receiving slot 17 and a card track 18. When the credit card 19 has been inserted into the slot 17 and track 18 as far as possible, its code-representing area 4 is contacted by a row of contact springs 20, which deliver a code-representing signal via plug connectors 21 on the side 22 of the printed circuit board 23 to an identifying circuit. The design of the side 22 is not shown. When the proper code has been detected, the credit card 19 has been approved and a control circuit 25 not shown in detail is activated to effect a deduction. For this purpose, the control circuit 25 starts the motor 26 to rotate the driving belt pulley 27 in the clockwise (advancing) sense in FIG. 4. That rotation of the pulley 27 is transmitted by the belt 28 and the driven belt pulley 29 to a backshaft 30, from which the rotation is transmitted by meshing gears 31 and 32 to a feed screw 33, which has a male screw threads 35 and extends through the marking electrode holder 34. The latter comprises a thread-engaging arm 35, which is in mesh with the male screw threads 35 and during a rotation of the feed screw 33 shifts the electrode holder 34 along the feed screw 34.

The thread-engaging arm 35 is resiliently biased against the feed screw 33 and is thus fractionally coupled to the screw threads 35 so that a rotation of the feed screw 33 in the advancing sense causes a marking electrode 38 carried by a lever 37 of the electrode holder 34 to bear against the credit card 19 with a force which is due to the frictional coupling. A worm 39 secured to the backshaft 30 is in mesh with the worm wheel 40, which is integral with the hub 41, which carries a rotatable contact carrier 42 so that the positive operative connection to the backshaft 30 ensures a synchronization of the movements. The contact carrier 42 carries an inner wiper contact 43, which slides on a circular contact strip 44, which provided on the pointed circuit board and is connected to the control circuit 25 by a conductor strip 45 and a plug connector 46. A segment-shaped second contact strip 47 is provided adjacent to an outer wiper contact 48 carried by the contact carrier 42 and is connected to the lead 50. The contacts 93 and 98 are electrically connected to each other. The angular spacing 49 corresponds exactly to the spacing of the graduations of the scales 7 and 8. When the credit card 19 has been properly inserted into the slot 17 and track 18, the terminal area 1 of the card is electrically conductively connected to the circular contact strip 44 so that the circuit for the marking current is completed.

Figures 6, 6A, 6B:
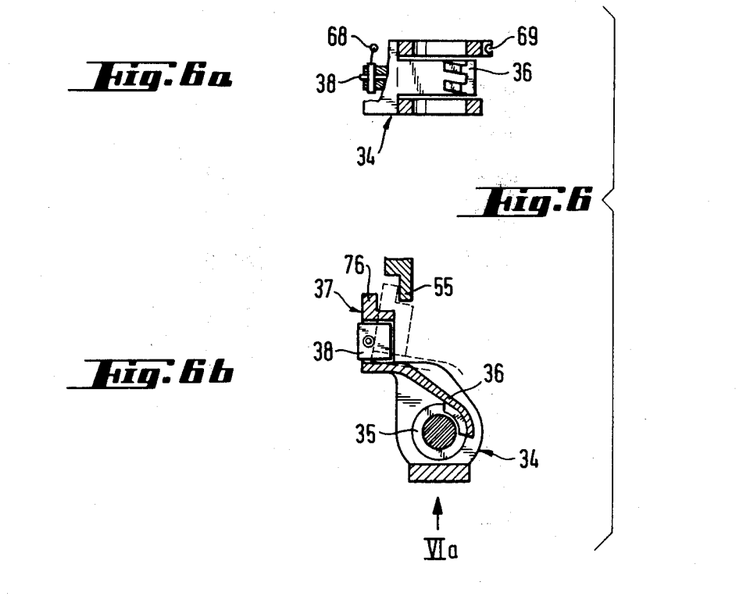

When the control circuit 25 is activated for the deduction of one or more value units, the marking electrode 38 is moved over the credit-representing area 5 to the end point 5a of the previously marked area. That end point 5a indicates the remaining credit. One or more incremental areas of the area 5 are then burnt off and the resulting marking current causes the control system 25 to detect that deduction and to generate a clearance signal for initiating or permitting the delivery of the corresponding merchandize or the performance of the corresponding service. When only one value unit is to be deducted, the marking current will be interrupted when the outer contact 48 of the contact carrier leaves the corresponding segment 51 of the contact strip so that the marking will then be terminated. As a result of that interruption of the marking current, the control circuit 25 reverses the motor 26 so that the marking electrode 38 is returned to its initial position. The auxiliary contact segment 52 is connected by a lead 53 and plug connector 54 to the control circuit 25 and de-energizes the motor 26 when the electrode 38 has reached its initial position. The appliance is then ready for the next deduction. During such reverse rotation of the feed screw 33, the latter owing to its frictional coupling to the arm 36 causes the marking electrode 38 carried by the lever 37 to lift from the credit card until the noise 54 of the marking electrode 38 bears on the stop bar 55, as is indicated in FIG. 6.

Another contact segment 56 is connected by a lead 57 and a plug connector 58 to the control circuit 25 and limits the advance movement of the marking electrode 38 so that the motor is reversed when the entire credit has been exhausted. During the last marking in the area 5, i.e., when the incremental area corresponding to the last value unit has been burnt off, the conductive strip 58 connecting the terminal area 1 to the credit-representing area 5 and the code-representing area 4 is severed so that the code of the credit card can no longer be read. This contact segment 59 is wider to ensure that the conductive strip 58 will be reliably severed.

Additional terminals 60 to 63 provided with soldering tags 64 to 67 serve to connect the marking electrode 38 and the motor 26 to the control circuit 25. The connection between the soldering tag and the reciprocating marking electrode 38 consists of a highly flexible stranded wire 68, which is secured to the electrode holder 34 by the wire holder 69. In a manner known per se, the control circuit 25 not shown in detail evaluates the signals, ensures that the various operations will be performed in the proper sequence in accordance with a program, and controls the energization of the power and of the marking electrode.

Figure 7:
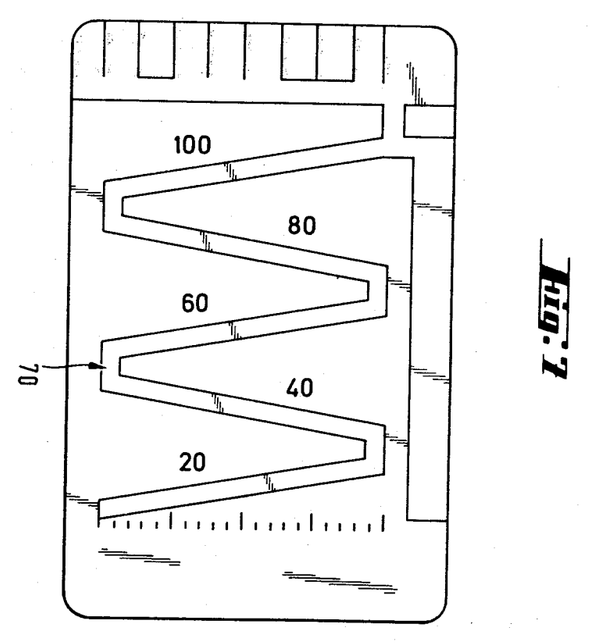
FIG. 7 shows a credit card having a higher capacity.

The credit-representing area need not have the shape of a straight strip as shown in FIGS. 1 and 2. A credit-representing area having a different configuration is shown by way of example in FIG. 7 and comprises a plurality of oblique length portions 70, which are electrically connected and represent a total of 100 value units. This credit card can be used with a marking appliance having a plurality of comblike marking electrodes, which cause incremenetal areas corresponding to value units to be burnt off when the credit card shown in FIG. 7 is pulled out of the appliance.

Such marking appliance comprises, e.g., 20 marking electrodes, which are aligned transversely to the direction of movement of the card, whereas the strip-shaped credit-representing area 70 extends at an oblique angle to said direction and the control circuit 25 ensures that during the pulley of the card out of the appliance the area 70 will be burnt off only in that incremental area which is contacted first by the marking electrodes.

In another embodiment of the credit card, not shown, the strip-shaped credit-representing area has the configuration of an arc of a circle or of a spiral and the associated marking appliance comprises means for moving the marking electrode along an arcuate or spiral path so that incremental areas of the credit-representing area are burnt off in succession.

Figure 8:
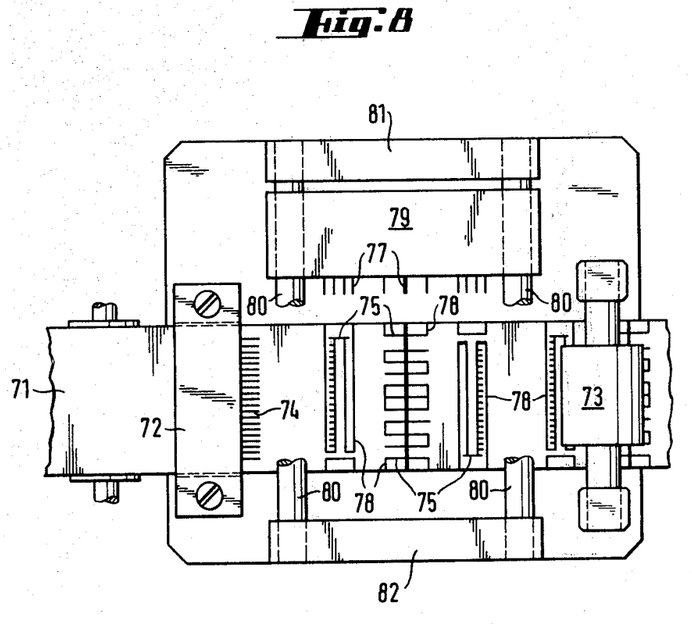
FIG. 8 is a top plan view showing an appliance for manufacturing credit cards.
Figure 9:
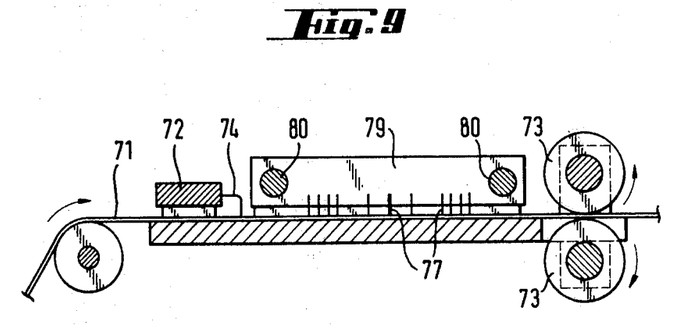
FIG. 9 is a longitudinal sectional view showing the appliance of FIG. 8

FIGS. 8 and 9 show by way of an example an appliance for manufacturing credit cards. A web of metal-coated cardboard 71 is fed into the appliance along a track 72 and is advanced in step by pinch rollers 73. Comblike marking electrodes 74 are associated with the track 72 and are supplied with marking current from a control circuit, not shown, so that the metal coating is burnt off at all longitudinal lines 75. When the web 71 marked at all longitudinal lines 75 has reached the position shown in FIG. 8, the web 71 is arrested and the comblike electrode 77 is operated to burn off the metal coating on the web along the transverse lines 78.

For this purpose the holder 79 carrying the comblike electrode 77 is mounted on pins 80, which are secured in the frames 81, 82 and along which the holder 79 is movable across the web 71. The marking electrodes 77 are supplied with marking current from a control system which is known per se and is not shown here in detail and which ensures that the marking along the transverse lines will be effected exactly at the desired positions and the desired code pattern will be obtained.

In additional operations, not shown, the credit cards are printed to cover the transversely extending non-conducting areas and to provide instructions, names or advertising slogans and are then severed from the web.

Figure 10:
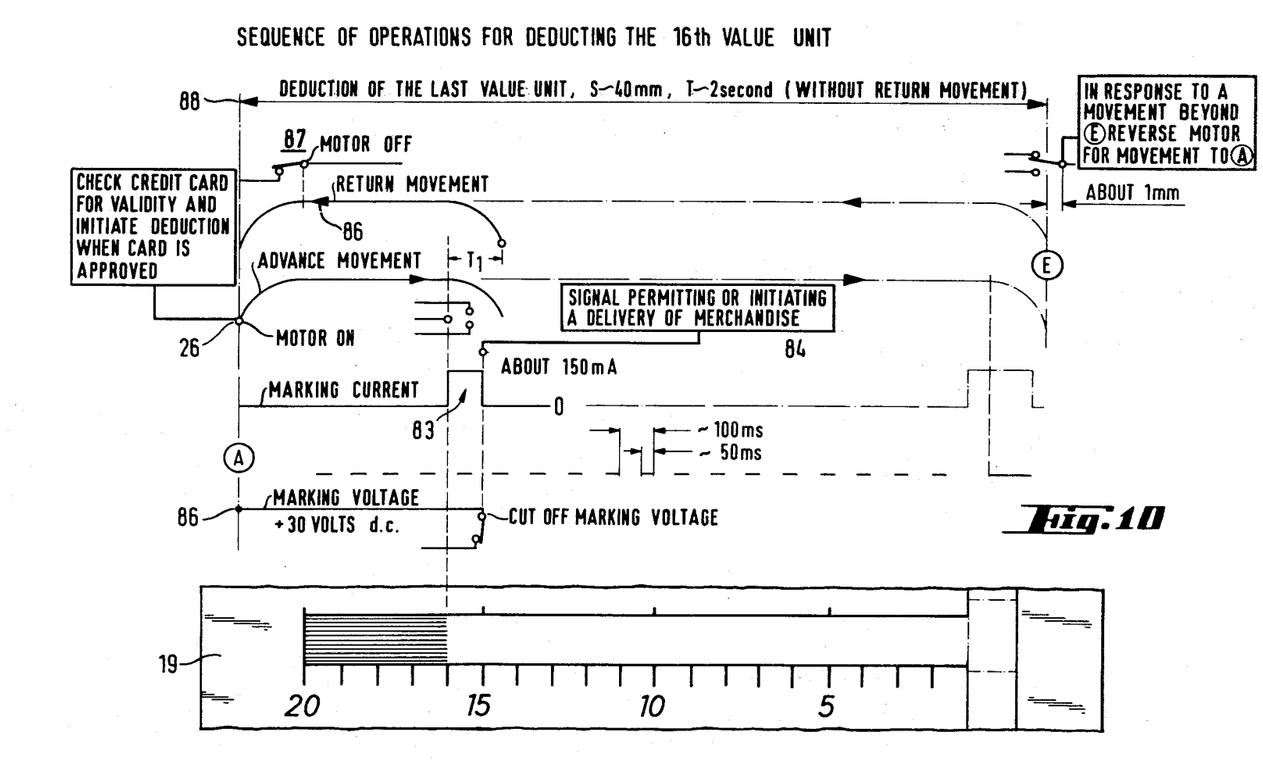
FIG. 10 is a diagrammatic sketch illustrating the sequence of operations performed in marking a credit card so as to effect a deduction from the credit.

FIG. 10 illustrates the sequence of steps of a marking operation corresponding to the deduction of the 17th value unit so that the credit-representing area 5 has been marked to indicate that a credit of 16 value units remains, as is also shown in FIG. 2. This is indicated by the marking to the graduation 5a. When the credit card 19 is then inserted for another deduction into the marking appliance and has been identified to have the proper code, the motor 26 is started to rotate in the advancing sense. As soon as the marking electrode 38 contacts the credit area adjacent to the graduation 5a, a marking current of about 150 mA flows and causes the control system 25 to generate clearance signal 84. As has been described with reference to FIG. 3, the wiper contact 48 then leaves the contact segment 51 so that the marking voltage line 85 is disconnected to indicate to the control-circuit 25 that the marking has been completed. The control circuit 25 then energizes the motor 26 for a rotation in a reversing sense via the reversing line 86, and the latter is disconnected by the contact segment 52 when the marking electrode has reached its initial position. The inscriptions at the time base line 88 indicate that the time required for a marking operation will depend on the remaining credit and the longest time of about 2 seconds will be required for the marking operation corresponding to the last valve unit.

What is claimed is:

1. In a credit card having at least one surface provided with an electrically conducting coating which is adapted to be marked by the action of an electric current flowing through said coating in a selected areas thereof, which surface comprises at least one credit-representing area adapted to be visibly marked in order to effect deductions from the credit represented by said card, the improvement residing in that said coating includes a terminal area, said at least one credit-representing area, and at least one code-representing area, said credit-representing area is electrically conductively connected on one side to said terminal area, said code-representing area has a portion which is electrically conductively connected to said terminal area and at least one isolated portion which is electrically disconnected from said terminal area, and said surface of said credit card has electrically non-conducting portions which are free from said coating and define said at least one credit-representing area except on said one side and define said at least one isolated portion of said at least one code-representing area and which separate said at least one credit-separating area and said isolated portions from said terminal area.

2. The improvement set forth in claim 1, wherein said code-representing area is defined by one edge of said credit card and said credit-representing area is spaced from all edges of said credit card.

3. The improvement set forth in claim 1, wherein said non-conducting portions separating said isolated portions from said terminal area are covered by an imprint extending beyond said non-conducting portions.

4. The improvement set forth in claim 1, wherein said credit-representing area is elongated and electrically conductively connected to said terminal area at one end, said non-conducting portions define said credit-representing area and separate it from said terminal area except at said one end, and said coating is adapted to be removed in successive incremental length-portions of said credit-representing area by the action of an electric current flowing through said coating in said length portions.

5. The improvement set forth in claim 4, wherein each of said incremental length portions represents a value unit of a credit represented by said credit-representing area.

6. The improvement set forth in claim 4, wherein said surface is provided along said credit-representing area with an imprint indicating successive incremental length portions of said credit-representing area.

7. The improvement set forth in claim 4, wherein said credit-representing area comprises a plurality of length portions which are electrically conductively connected to each other and each of which extends at an oblique angle to an axis of said card.

8. The improvement set forth in claim 4, wherein said credit-representing area has the configuration of an arc of a circle.

9. The improvement set forth in claim 4, wherein said credit-representing area has the configuration of a spiral.

10. The improvement set forth in claim 4, wherein said coating has adjacent to said one end of said credit-representing area a strip-shaped portion connecting said terminal area to said credit-representing area and to said code-representing area.

11. The improvement set forth in claim 1, wherein said surface comprises a second of said code-representing areas and a second of said credit-representing areas.

12. The improvement set forth in claim 1, wherein said credit card has two of said surfaces on opposite sides of said card and is provided on each of said surfaces with said coating and said non-conducting portions.

13. In the process of manufacturing an improved credit card having at least one surface provided with an electrically conducting coating which is adapted to be marked by the action of an electric current flowing through said coating in selected areas thereof, which surface comprises at least one credit-representing area adapted to be visibly marked in order to effect deductions from the credit represented by said card, wherein said coating includes a terminal area, said at least one credit-representing area, and at least one code-representing area, said credit-representing area is electrically conductively connected on one side to said terminal area, said code-representing area has a portion which is electrically conductively connected to said terminal area and at least one isolated portion which is electrically disconnected from said terminal area, and said surface of said credit card has electrically non-conducting portions which are free from said coating and define said at least one credit-representing area except on said one side and define said at least one isolated portion of said at least one code-representing area and which separate said at least one credit-separating area and said isolated portions from said terminal area, the improvement residing in that a blank is provided, which is covered by said electrically conductive coating throughout said surface, and said non-conducting portions are formed in said surface in that said coating is selectively removed from said surface in said non-conducting portions by the action of an electric current flowing through said coating.

14. The improvement set forth in claim 13, wherein said non-conducting portions are formed in said blank when the same is in the form of a web and said card is severed from said web when said coating has been removed from said non-conducting part.

15. The improvement set forth in claim 14, wherein said web is provided with an imprint before said card is severed from said web.

16. In an electrically operable marking appliance for manufacturing an improved credit card having at least one surface provided with an electrically conducting coating which is adapted to be marked by the action of an electric current flowing through said coating in selected areas thereof, which surface comprises at least one credit-representing area adapted to be visibly marked in order to effect deductions from the credit represented by said card, wherein said coating includes a terminal area, said at least one credit-representing area, and at least one code-representing area, said credit-representing area is electrically conductively connected on one side to said terminal area, said code-representing area has a portion which is electrically conductively connected to said terminal area and at least one isolated portion which is electrically disconnected from said terminal area, and said surface of said credit card has electrically non-conducting portions which are free from said coating and define said at least one credit-representing area except on said one side and define said at least one isolated portion of said at least one code-representing and which separate said at least one credit-separating area and said isolated portions from said terminal area, which appliance comprises marking electrode means for removing said coating from selected areas of a card blank, by the action of an electric current flowing through said coating in said areas, the improvement residing in that said apparatus comprises means for operating said marking electrode means for removing said coating from said card blank in the areas corresponding to said non-conducting portions.

17. The improvement set forth in claim 16, wherein card-feeding means are provided for moving said card blank past said marking electrode means and control means are provided for energizing said marking electrode means in dependence on the position of said card blank relative to said marking electrode means.

18. The improvement set forth in claim 17, wherein said marking electrode means comprise first and second sets of marking electrodes, the marking electrodes of said first set are aligned in a first direction, the marking electrodes of said second set are aligned in a second direction, which is at right angles to said first direction, and are movable in said first direction, said card-feeding means are adapted to feed a web which constitutes said card blank past said marking electrode means in predetermined increments of movement in said second direction and to arrest said web for an interval of time after each such increment, and said control means are operable to cause said marking electrodes of said first set to remove said coating from said card blank in the areas corresponding to said longitudinally extending non-conducting portions during said predetermined increments of movement, and to cause said marking electrodes of said second set to move in said first direction and to remove said coating from said card blank in the areas corresponding to said transversely extending non-conducting portions during said intervals of time.

19. The improvement set forth in claim 18, wherein said marking electrodes of said second set comprise a marking electrode for removing said coating from said blank in selected areas corresponding to said transversely extending non-conducting areas for separating said isolated areas of said code-representing area from said terminal area and said control means comprises encoding logic circuitry for controlling the energization of said marking electrode during its movement in said first direction in dependence on a desired code.

20. The improvement set forth in claim 18, wherein severing means are provided for removing each card provided with said non-conducting portions from said web.

21. The improvement set forth in claim 18, wherein printing means are provided for making imprints on said web when the same has been provided with said non-conducting portions.

22. In a marking appliance for marking an improved credit card in order to effect deductions from credit represented by said card, said card having at least one surface provided with an electrically conducting coating which is adapted to be marked by the action of an electric current flowing through said coating in selected areas thereof, which surface comprises at least one credit-representing area adapted to be visibly marked in order to effect deductions from the credit represented by said card, wherein said coating includes a terminal area, said at least one credit-representing area, and at least one code-representing area, said credit-representing area is electrically conductively connected on one side to said terminal area, said code-representing area has a portion which is electrically conductively connected to said terminal area and at least one isolated portion which is electrically disconnected from said terminal area, and said surface of said credit card has electrically non-conducting portions which are free from said coating and define said at least one credit-representing area except on said one side and define said at least one isolated portion of said at least one code-representing and which separate said at least one credit-separating area and said isolated portions from said terminal area, the improvement residing in that a card holder is provided, which is adapted to receive said credit card and to hold it in a predetermined position, a code detector is provided, which comprises a set of contacts arranged to contact said code-representing area of a card held in said predetermined position and is adapted to detect a code represented by said area, said marking means are provided, which are adapted to mark said coating in successive incremental portions of said credit-representing area by the action of electric current flowing through each of said incremental portions, and control means are provided, which comprise means for storing a prescribed code, comparing means for comparing the code detected by said code detector with said prescribed code, means for operating said marking means when said comparing means indicate that said detected code is identical to said prescribed code.

23. The improvement set forth in claim 22, as applied to an appliance for marking such credit card in which said credit-representing area is elongated and said coating has a strip-shaped portion which electrically conductively connects said terminal area to said credit-representing area at one end thereof and to said code-representing area, wherein said marking means are arranged to mark said coating in a selected area by removing said coating from said selected area by the action of electric current flowing through said contact in said selected area, said control means are operable to cause said marking means to mark said coating in said credit-representing area in successive incremental length portions from that end of said credit-representing area which is opposite to said one end, and said control means are arranged to cause said marking means to remove said coating from said strip-shaped area so as to electrically disconnect said credit-representing area and said code-representing area from said terminal area when said marking means has removed said coating from said credit-representing area adjacent to said one end thereof.

24. The improvement set forth in claim 22 as applied to an appliance for making such credit card in which said credit-representing area is elongated and electrically conductively connected to said terminal area at one end, wherein said marking means are arranged to mark said coating in a selected area by removing said coating from said selected area by the action of electric current flowing through said contact in said selected area, said control means are operable to cause said marking means to mark said coating in said credit-representing area in successive incremental length portions from that end of said credit-representing area which is opposite to said one end, said marking means comprise a marking electrode and drive means for moving said marking electrode along said credit-representing area of a card held in said predetermined position, said control means are operable to cause said drive means to advance said marking electrode in contact with said credit-representing area from an initial position at the opposite end of said credit-representing area toward said one end thereof, said control means are operable to energize said marking electrode when the same is in contact with said coating in said credit-representing area and to de-energize said marking electrode after said coating has been removed from a predetermined number of said incremental length portions, and said control means are operable to cause said drive means to return said marking electrode to said initial position when said marking electrode has thus been de-energized.

25. The improvement set forth in claim 24, wherein said marking means comprise a stop adjacent to said marking electrode and electrode-actuating means which are frictionally coupled to said drive means and arranged to move said marking electrode into contact with said credit-representing area in response to an operation of said drive means to advance said marking electrode and for lifting said marking electrode from said credit-representing area and moving said marking electrode into engagement with said stop in response to an operation of said drive means to return said marking electrode toward said initial position.

26. The improvement set forth in claim 25, wherein said drive means comprises a feed screw which is rotatable to move said marking electrode along said credit-representing area and said electrode-actuating means are frictionally coupled to said feed screw.

27. The improvement set forth in claim 24, wherein said control means comprise a marking current circuit for energizing said marking electrode, which marking current circuit comprises a circular array of spaced apart contact segments associated with respective incremental length portions of said credit-representing area and a wiper contact, which is movable along said circular array to contact said contact segments in succession, whereby said marking current circuit is closed when said marking electrode contacts said metal coating in said credit-representing area and said wiper contact contacts one of said contact segments, said control means comprises means for moving said wiper contact along said circular array in unison with the movement of said marking electrode along the corresponding incremental length portions of said credit-representing area, and the spacing of said contact segments exceeds the corresponding dimension of said wiper contact so that said wiper contact is adapted to open said marking current circuit when said wiper contact leaves one of said contact segments.

28. The improvement set forth in claim 27, wherein said marking current circuit comprises a circular contact arranged to be electrically conductively connected to said terminal area of said card held in said predetermined position, and a second wiper contact, which is electrically connected to said first-mentioned wiper contact and arranged to move in contact with said circular contact in unison with the movement of said first-mentioned wiper contact along said circular array.

29. The improvement set forth in claim 24, wherein said control means comprise a drive control circuit for operating said drive means to advance said marking electrode when said comparing means indicate that said detected code is identical to said desired code.

30. The improvement set forth in claim 29, wherein said control means comprise a clearance signal generator for delivering a clearance signal in response to the energization of said making electrode.

31. The improvement set forth in claim 30, wherein said clearance signal generator comprises an amplifier.

32. The improvement set forth in claim 29, wherein said drive control circuit is arranged to operate said drive means to return said marking electrode toward said initial position in response to the de-energization of said marking electrode.

33. The improvemenet set forth in claim 29, wherein said drive control circuit is arranged to deenergize said drive means when said marking electrode is in said initial position.

34. The improvement set forth in claim 24, wherein said control means comprise selector means for selecting said predetermined number of incremental length portions.

35. The improvement set forth in claim 34, wherein said selector means comprise a presettable counter.

36. The improvement set forth in claim 22, which comprises a digital display for indicating the remaining credit represented by said circuit-representing area of said card in said predetermined position.

* * * * *